US007608137B2

(12) United States Patent
Oda

(10) Patent No.: US 7,608,137 B2
(45) Date of Patent: Oct. 27, 2009

(54) AIR CLEANER AND FUEL ADSORBENT MEMBER

(75) Inventor: Kouichi Oda, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 388 days.

(21) Appl. No.: 11/423,248

(22) Filed: Jun. 9, 2006

(65) Prior Publication Data

US 2006/0283326 A1 Dec. 21, 2006

(30) Foreign Application Priority Data

Jun. 15, 2005 (JP) ............................ 2005-075466

(51) Int. Cl.
*F02M 35/024* (2006.01)
*B01D 53/04* (2006.01)

(52) U.S. Cl. .......................... 96/134; 55/309; 55/385.3; 55/511

(58) Field of Classification Search .................. 95/146; 96/134, 135, 147; 55/309, 385.3, 490, 495, 55/511; 123/518
See application file for complete search history.

(56) References Cited

U.S. PATENT DOCUMENTS

| | | | | |
|---|---|---|---|---|
| 3,499,269 | A * | 3/1970 | Bois Anthelme | 55/309 |
| 3,572,013 | A * | 3/1971 | Hansen | 96/138 |
| 3,572,014 | A * | 3/1971 | Hansen | 96/138 |
| 3,678,663 | A * | 7/1972 | Hansen | 96/141 |
| 4,418,662 | A * | 12/1983 | Engler et al. | 96/133 |
| 4,699,681 | A * | 10/1987 | Kasmark et al. | 156/264 |
| 6,309,451 | B1 * | 10/2001 | Chen | 96/134 |
| 6,346,130 | B2 * | 2/2002 | Suzuki | 55/311 |
| 6,383,268 | B2 * | 5/2002 | Oda | 96/134 |
| 6,402,811 | B1 * | 6/2002 | Shanks et al. | 95/90 |
| 6,464,761 | B1 * | 10/2002 | Bugli | 96/135 |
| 2002/0124733 | A1 * | 9/2002 | Iriyama et al. | 96/134 |

FOREIGN PATENT DOCUMENTS

| | | | |
|---|---|---|---|
| JP | 2001-263177 | * | 9/2001 |
| JP | 2002-266713 | | 9/2002 |
| JP | 2002-276486 | | 9/2002 |
| JP | 2003-042017 | | 2/2003 |

* cited by examiner

*Primary Examiner*—Frank M Lawrence
(74) *Attorney, Agent, or Firm*—Caesar, Rivise, Bernstein, Cohen & Pokotilow, Ltd.

(57) ABSTRACT

A fuel adsorbent member 16 is arranged in a housing 11 at a position downstream from a filter element 14. The fuel adsorbent member 16 adsorbs evaporative fuel. An air cleaner is configured in such a manner that, when receiving a backfire pressure P1 from an engine, the fuel adsorbent member 16 is held in the state secured to the housing 11. Specifically, release holes 22 are defined in a portion of the fuel adsorbent member 16 for releasing the backfire pressure P1 through the release holes 22.

12 Claims, 7 Drawing Sheets

AIR CLEANER AND FUEL ADSORBENT MEMBER

BACKGROUND OF THE INVENTION

The present invention relates to a fuel adsorbent member that adsorbs evaporative fuel leaking from an engine intake system and an air cleaner including the fuel adsorbent member.

Japanese Laid-Open Patent Publication No. 2002-266713, for example, describes a typical fuel adsorbent member and a typical air cleaner. Specifically, a filter element that filters intake air is arranged in a housing of the air cleaner. A fuel adsorbent member is also provided in the housing at a position downstream from the filter element. The fuel adsorbent member adsorbs evaporative fuel leaking from an intake system of an engine. The filter element and the fuel adsorbent member are each arranged in a manner crossing an air passage defined in the air cleaner.

However, if an engine backfire occurs and applies pressure to the air cleaner, the pressure acts to press the fuel adsorbent member against the filter element. This may damage a securing portion of the fuel adsorbent member by which the fuel adsorbent member is secured to the housing of the air cleaner. If this is the case, fragments from the damaged part may enter the engine and cause an engine problem.

Further, as described in Japanese Laid-Open Patent Publication No. 2002-266713, an outer end of the fuel adsorbent member is covered by a resin frame member so as to reinforce the securing portion of the fuel adsorbent member by which the fuel adsorbent member is secured to the housing of the air cleaner. This allows the securing portion of the fuel adsorbent member to bear the pressure caused by the engine backfire. However, since the resin frame member, or a reinforcing structure, is relatively large, the manufacturing costs of the air cleaner are raised.

SUMMARY OF THE INVENTION

Accordingly, it is an objective of the preset invention to provide an air cleaner that prevents damage to a securing portion of an adsorbent member when receiving pressure caused by an engine backfire and has a simplified configuration.

To achieve the foregoing objective, one aspect of the present invention provides an air cleaner having a filter element that filters air. The filter element includes a housing, a fuel adsorbent member, and a holder. The housing accommodates the filter element. The fuel adsorbent member is secured to the housing and adsorbs evaporative fuel. The fuel adsorbent member is provided downstream from the filter element. The holder holds the fuel adsorbent member in a state secured to the housing when the fuel adsorbent member receives a backfire pressure from an intake system of an engine. The holder is arranged in a portion of the fuel adsorbent member in which an extent of influence by the backfire pressure is great.

Another aspect of the present invention provides a fuel adsorbent member used in an air cleaner for adsorbing evaporative fuel. The fuel adsorbent member has a sheet-like shape as a whole. The fuel adsorbent member includes a low air flow resistance portion formed in an outer end of the fuel adsorbent member for partially decreasing air flow resistance of the outer end of the fuel adsorbent member. When the fuel adsorbent member is installed in the air cleaner, a backfire pressure of an engine is released through the low air flow resistance portion.

A further aspect of the present invention provides a fuel adsorbent member used in an air cleaner for adsorbing evaporative fuel. The fuel adsorbent member has a sheet-like shape as a whole. The fuel adsorbent member includes a high strength portion that has a partially heightened securing strength with respect to the housing.

Another aspect of the present invention provides a fuel adsorbent member used in an air cleaner for adsorbing evaporative fuel. The fuel adsorbent member has a sheet-like shape as a whole. The fuel adsorbent member includes a high rigidity portion formed in an outer end of the fuel adsorbent member for focally increasing rigidity of the outer end of the fuel adsorbent member. When the fuel adsorbent member is installed in the air cleaner, the high rigidity portion bears a backfire pressure of an engine.

Other aspects and advantages of the invention will become apparent from the following description, taken in conjunction with the accompanying drawings, illustrating by way of example of the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 and 2.

Figure 1:
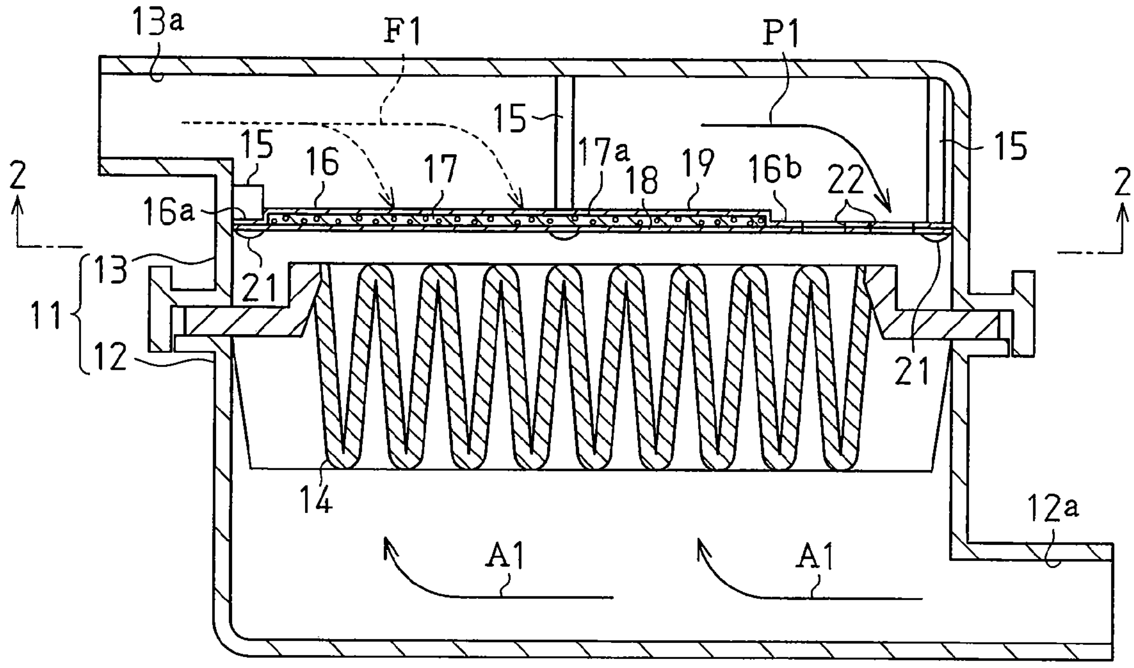
FIG. 1 is a longitudinal cross-sectional view showing an air cleaner according to a first embodiment of the present invention.

As shown in FIG. 1, an air cleaner has a housing 11 defined by a first housing member 12 and a second housing member 13. The first housing member 12 has an inlet port 12*a*. An opening is defined in an upper side of the first housing member 12. The second housing member 13 has an outlet port 13*a*. An opening is defined in a lower side of the second housing member 13. The first and second housing members 12, 13 are joined together through a clamp (not shown) with the openings of the first and second housing members 12, 13 opposed to each other.

A pleated filter element 14 is arranged between the first housing member 12 and the second housing member 13. The filter element 14 has a number of element pleats 14*a*. The filter element 14 thus filters intake air A1, which is supplied through an intake system of an engine.

A plurality of projections 15 project from an inner wall of the second housing member 13 at positions downstream from the filter element 14. A pin 21 is provided in the distal end of each of the projections 15. A fuel adsorbent member 16 is provided downstream from the filter element 14. The fuel adsorbent member 16 is permeable to the air and adsorbs evaporative fuel leaking from the intake system of the engine. The filter element 14 and the fuel adsorbent member 16 are each arranged in a manner crossing an air passage that extends from the inlet port 12*a* to the outlet port 13*a*.

Figure 2:
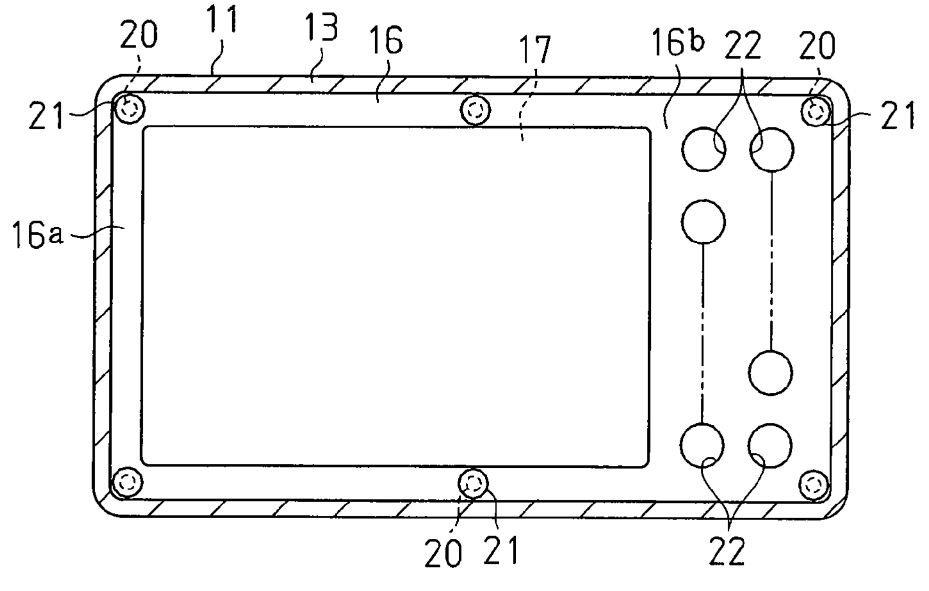
FIG. 2 is a cross-sectional view taken along line 2-2 of FIG. 1.

Referring to FIGS. 1 and 2, the fuel adsorbent member 16 has a holding sheet 17 and a pair of cover sheets 18, 19 that cover opposing sides of the holding sheet 17. The holding sheet 17 is formed of a non-woven sheet base that holds granular adsorbent 17*a* formed of, for example, activated carbon. The cover sheets 18, 19 are each formed of non-woven textile. A peripheral flange 16*a*, or a securing portion, is formed along an outer end of the fuel adsorbent member 16. The peripheral flange 16*a* has a double-layered structure and is formed by bonding an outer end of the cover sheet 18 with an outer end of the cover sheet 19. At least the cover sheet 18, which is located downstream from the cover sheet 19, is formed of relatively large fibers so that the cover sheet 18 can bear the heat caused by the engine backfire.

A plurality of attachment holes 20 are defined in the peripheral flange 16*a* of the fuel adsorbent member 16 and spaced from one another. Each of the attachment holes 20 of the fuel adsorbent member 16 receives the pin 21 of the corresponding projection 15. The fuel adsorbent member 16 is secured to the projections 15 by thermally swaging the pins 21 to the associated attachment holes 20.

The fuel adsorbent member 16 includes a double-layered portion 16*b* that is formed to face the outlet port 13*a*. The double-layered portion 16*b* is formed continuously from the peripheral flange 16*a* by overlapping and bonding the cover sheets 18, 19 with each other. A plurality of release holes 22 are defined in the double-layered portion 16*b* and spaced from one another. Each of the release holes 22 functions as a release portion (a low air flow resistance portion), which forms the holder. This decreases the air flow resistance of the double-layered portion 16*b* compared to the remainder of the fuel adsorbent member 16. Thus, even if an engine backfire occurs and backfire pressure P1 is introduced into the housing 11 through the outlet port 13*a*, the backfire pressure P1 is smoothly released from the release holes 22 into the filter element 14. This prevents the fuel adsorbent member 16 from being pressed against the filter element 14, thus maintaining the fuel adsorbent member 16 in a state secured to the second housing member 13.

Next, operation of the air cleaner will be explained with reference to FIGS. 1 and 2.

With reference to FIGS. 1 and 2, the fuel adsorbent member 16 is installed in the housing 11 with the double-layered portion 16*b* located closer to the inlet port 12*a*.

When the engine runs, the intake air A1 is supplied to the engine through the housing 11, into which the intake air A1 is sent through the inlet port 12*a*. In the housing, dust or the like is filtered from the intake air A1 by the filter element 14.

When the engine is not in operation, evaporative fuel F1 leaking from the intake system of the engine enters the second housing member 13 of the housing 11 through the outlet port 13*a*. Since the specific gravity of evaporative fuel F1 is greater than that of the intake air A1, Evaporative fuel F1 flows downward in the housing without proceeding to the right hand side as viewed in FIG. 1. The evaporative fuel F1 is thus adsorbed by the granular adsorbent 17*a* of the holding sheet 17 of the fuel adsorbent member 16. This suppresses release of evaporative fuel F1 into the environment, preventing the air pollution. Further, since evaporative fuel F1 does not easily reach the double-layered portion 16*b*, the double-layered portion 16*b* does not contain the granular adsorbent 17*a*. This reduces the amount of the granular adsorbent 17*a* used in the fuel adsorbent member 16. However, the fuel adsorbent member 16 exhibits adsorbing performance equivalent to a case in which the granular adsorbent 17*a* are provided entirely in the fuel adsorbent member 16.

In the case of an engine backfire, the backfire pressure P1 is introduced into the housing 11 through the outlet port 13*a*. Specifically, the backfire pressure P1 acts in the second housing member 13 of the housing 11 along the axis of the outlet port 13*a*. Thus, the extent of influence by the backfire pressure P1 becomes greater in the vicinity of an inner wall surface of the second housing member 13 opposed to the outlet port 13*a*, which is more spaced from the outlet port 13*a*.

However, in the first embodiment, the release portions each forming the maintenance means are provided in the portion of the fuel adsorbent member 16 in which the extent of the influence by the backfire pressure P1 becomes greater. The release portions are defined by the release holes 22 defined in the fuel adsorbent member 16. The backfire pressure P1 is thus smoothly released into the filter element 14 through the release holes 22. This prevents the backfire pressure P1 from acting to press the fuel adsorbent member 16 against the filter element 14. The securing portion of the fuel adsorbent member 16, by which the fuel adsorbent member 16 is secured to the projections 15 of the second housing member 13, is thus prevented from being damaged. Therefore, an engine problem caused by damage to the securing portion of the fuel adsorbent member 16 is avoided.

Further, in the first embodiment, the release holes 22 are provided in the double-layered portion 16*b* of the fuel adsorbent member 16 as means for releasing backfire pressure. This makes it unnecessary to reinforce the securing portion of the fuel adsorbent member 16 with respect to the housing 11, unlike the conventional case in which the outer end of the fuel adsorbent member 16 is covered with resin. The configuration of the fuel adsorbent member 16 is thus simplified.

Further, the release holes 22 decrease the air flow resistance of the fuel adsorbent member 16 as a whole, thus suppressing decrease of efficiency caused by pressure loss in the engine.

The release holes 22 are defined at positions spaced from the outlet port 13*a*, or outside the air passage in the air cleaner. Thus, by adjusting the positions and the areas of the release holes 22, the air passage can be defined in such a manner as to substantially cover the entire portion of the housing 11. In this case, filtering of the air is effectively performed in the entire portion of the filter element 14.

The first embodiment has the following advantages.

(1) Since evaporative fuel F1 is reliably adsorbed by the granular adsorbent 17*a* without being released into the environment, the air pollution is suppressed.

(2) The granular adsorbent 17*a* is not provided in the portion of the fuel adsorbent member 16 that does not receive evaporative fuel F1. This reduces the amount of the granular adsorbent 17*a*, decreasing the costs for manufacturing the air cleaner.

(3) The multiple release holes 22 are defined in the portion of the fuel adsorbent member 16 in which the extent of influence by the backfire pressure P1 becomes greater. The backfire pressure P1 is thus smoothly released into the filter element 14 through the release holes 22. This prevents damage to the securing portion of the fuel adsorbent member 16 by which the fuel adsorbent member 16 is secured to the projections 15 of the second housing member 13.

(4) Compared to the conventional case in which the outer end of the fuel adsorbent member 16 is covered by a resin frame, the fuel adsorbent member 16 of the first embodiment has a simple configuration.

(5) The release holes 22 decrease the air flow resistance of the fuel adsorbent member 16 as a whole. This suppresses decrease of efficiency caused by pressure loss in the engine.

(6) The backfire pressure P1 is released into the filter element 14 through the release holes 22. It is thus unnecessary to provide an additional structure in the housing 11 for resisting the backfire pressure P1. This further reduces the costs for manufacturing the air cleaner.

A second embodiment of the present invention will hereafter be described with reference to FIGS. 3 and 4. The description will omit detailed explanation of components of the second embodiment that are same as or like the corresponding components of the first embodiment.

Figure 3:
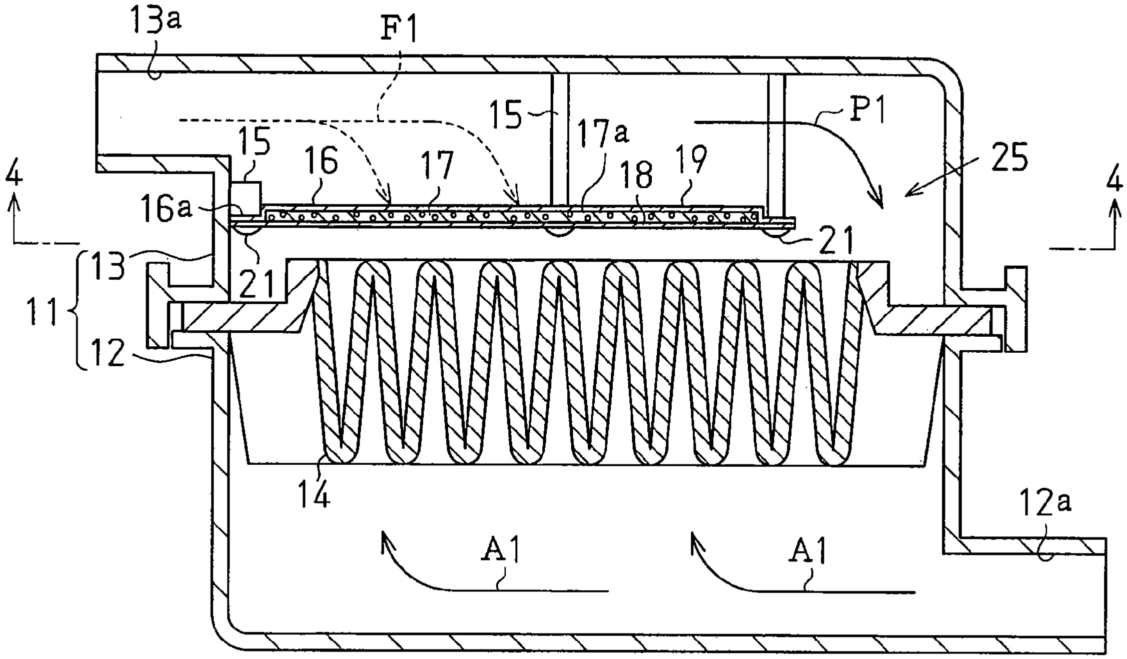
FIG. 3 is a longitudinal cross-sectional view showing an air cleaner according to a second embodiment of the present invention.
Figure 4:
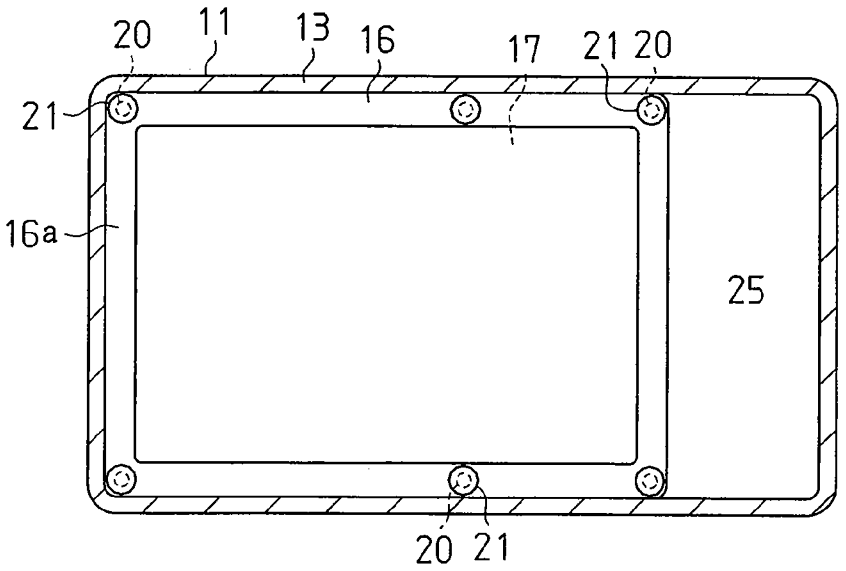
FIG. 4 is a cross-sectional view taken along line 4-4 of FIG. 3.

As illustrated in FIGS. 3 and 4, the surface area of the fuel adsorbent member 16 is smaller than the opening area of the second housing member 13 (the cross-sectional area of the air passage). Further, a release portion defining the holder is provided in a portion of the second housing member 13 in which the extent of influence by the backfire pressure P1 becomes greater, or the portion spaced from the outlet port 13*a*. The release portion is defined by a release space 25 defined between an end of the fuel adsorbent member 16 and the second housing member 13. The backfire pressure P1, which is introduced into the second housing member 13 through the outlet port 13*a*, is smoothly released into the filter element 14 through the release space 25.

The second embodiment has the following advantage.

(7) Since the fuel adsorbent member 16 is reduced in size as a whole, the costs for manufacturing the air cleaner further decrease.

A third embodiment of the present invention will hereafter be described with reference to FIGS. 5 and 6. The description will omit detailed explanation of components of the third embodiment that are same as or like the corresponding components of the first embodiment.

Figure 5:
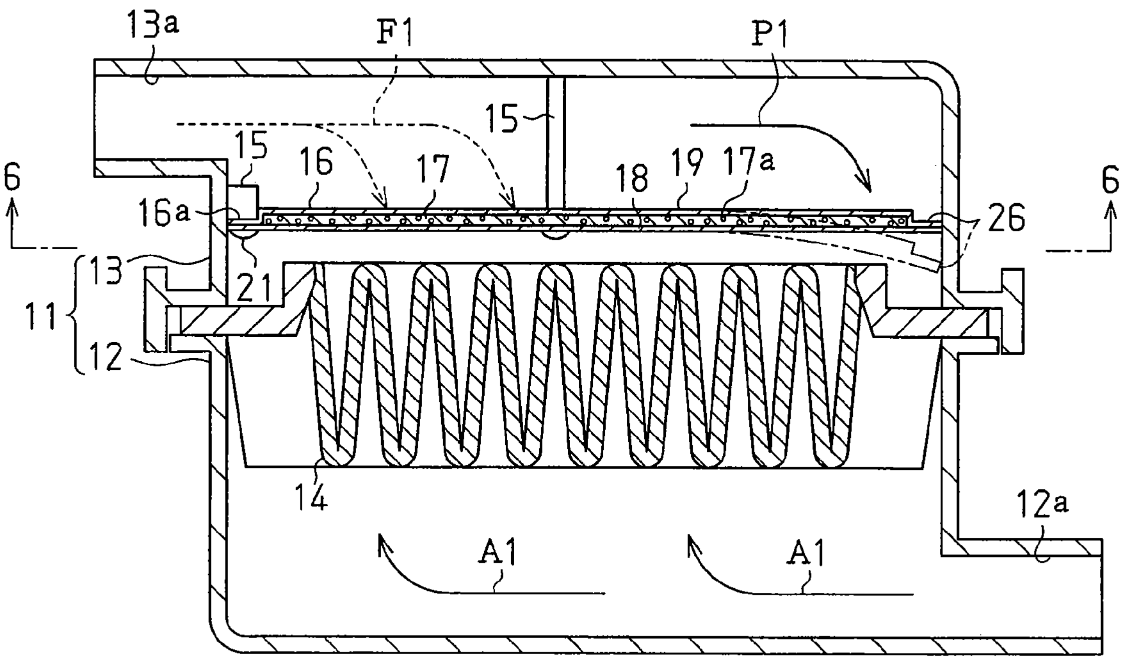
FIG. 5 is a longitudinal cross-sectional view showing an air cleaner according to a third embodiment of the present invention.
Figure 6:
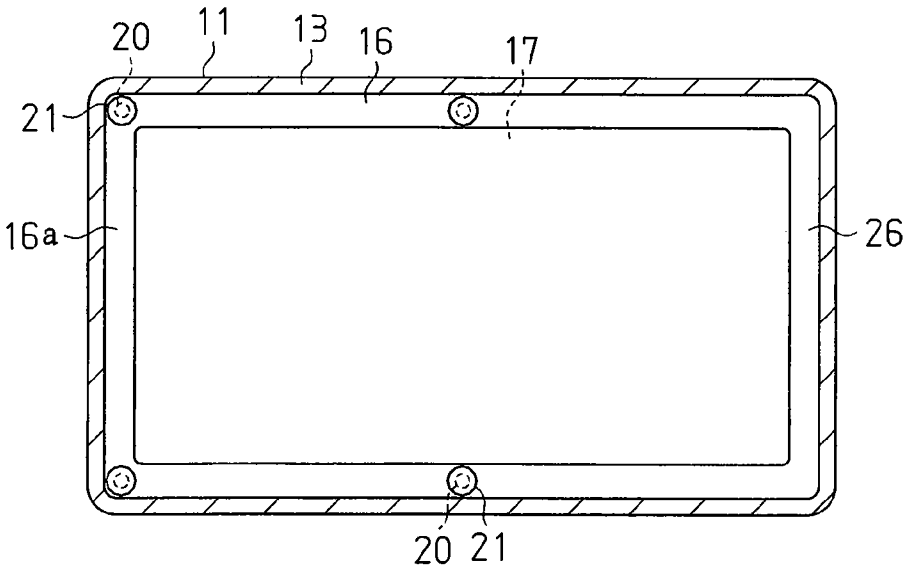
FIG. 6 is a cross-sectional view taken along line 6-6 of FIG. 5.

As illustrated in FIGS. 5 and 6, the fuel adsorbent member 16 extends in such a manner as to entirely cover the air passage defined in the second housing member 13. A holding sheet 17 is provided in the portion of the fuel adsorbent member 16 except for the peripheral flange 16*a*. The fuel adsorbent member 16 further includes a flexibly bendable portion 26 formed at a position spaced from the outlet port 13*a*, instead of the projections 15 of FIG. 1. The flexibly bendable portion 26 functions as a release portion, or the holder, through flexible bending. Specifically, when the backfire pressure P1 is introduced into the second housing member 13 through the outlet port 13*a*, the flexibly bendable portion 26 bends toward the filter element 14, as indicated by the corresponding broken line of FIG. 5. This defines a gap between the flexibly bendable portion 26 and the second housing member 13. The backfire pressure P1 is thus smoothly released into the filter element 14 through the gap.

The third embodiment has the advantages equivalent to the advantages (1), (3), (4), and (6) of the first embodiment.

A fourth embodiment of the present invention will hereafter be described with reference to FIG. 7. The description will omit detailed explanation of components of the fourth embodiment that are same as or like the corresponding components of the first embodiment.

Figure 7:
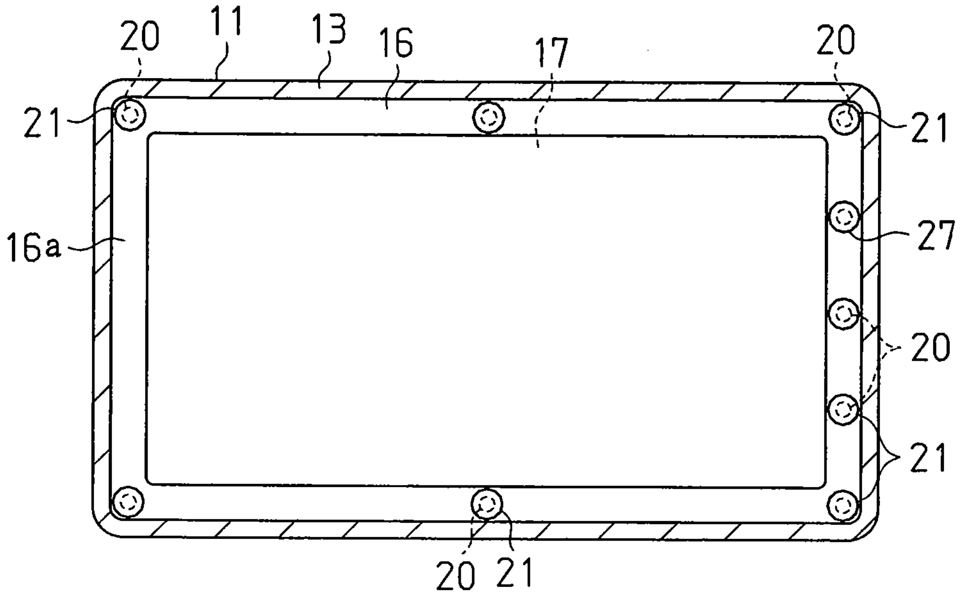
FIG. 7 is a cross-sectional view showing an air cleaner according to a fourth embodiment of the present invention.

Referring to FIG. 7, the securing strength of the fuel adsorbent member 16 with respect to the second housing member 13 is greater in the portion of the fuel adsorbent member 16 in which the extent of influence by the backfire pressure P1, or the portion spaced from the outlet port 13*a*, compared to the other parts of the fuel adsorbent member 16. This portion is referred to as a high strength portion 27. More specifically, the fuel adsorbent member 16 is thermally swaged and thus secured to the projections 15. The quantity of such thermal swaging points in the high strength portion 27 is greater than that of the other parts of the fuel adsorbent member 16. The high strength portion 27 thus reinforces the portion of the fuel adsorbent member 16 in which the extent of influence by the backfire pressure P1 becomes greater. Therefore, even if the backfire pressure P1 is introduced into the second housing member 13 through the outlet port 13*a*, the securing portion of the fuel adsorbent member 16, by which the fuel adsorbent member 16 is secured to the projections 15 of the second housing member 13, is prevented from being damaged. Accordingly, the fourth embodiment has advantages equivalent to the advantages of the third embodiment.

A fifth embodiment of the present invention will hereafter be described with reference to FIGS. 8 and 9. The description will omit detailed explanation of components of the fifth embodiment that are same as or like the corresponding components of the first embodiment.

Figure 8:
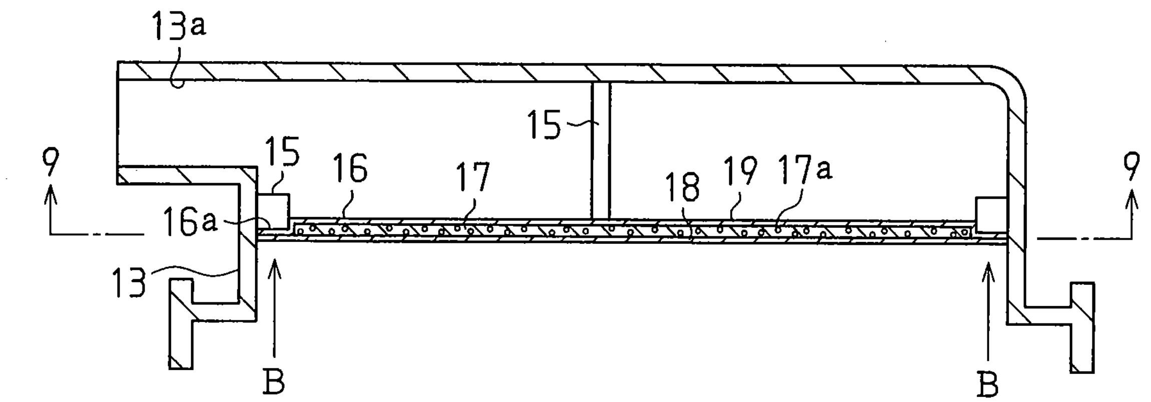
FIG. 8 is a longitudinal cross-sectional view showing a portion of an air cleaner according to a fifth embodiment of the present invention.
Figure 9:
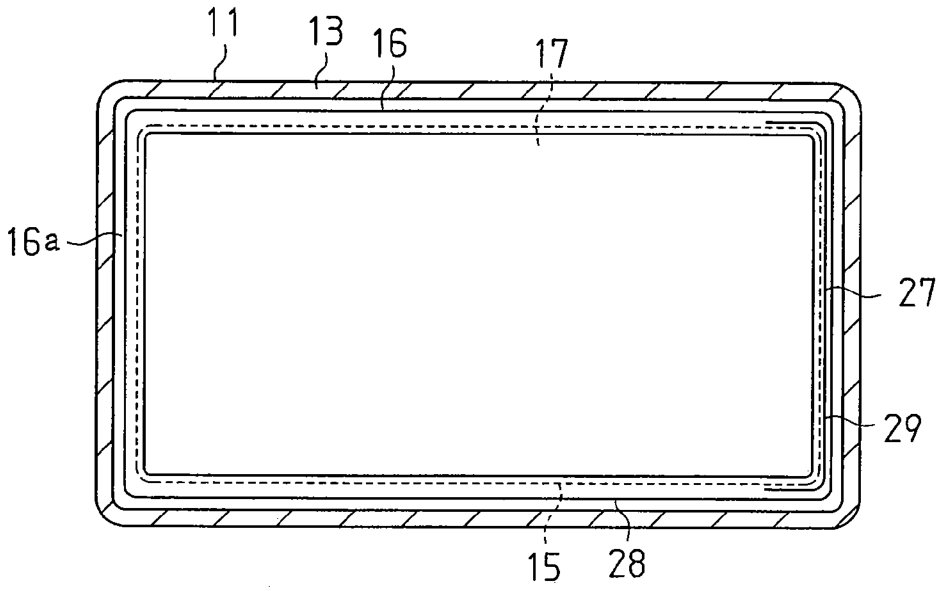
FIG. 9 is a cross-sectional view taken along line 9-9 of FIG. 8.

As shown in FIGS. 8 and 9, the second housing member 13 has a continuous projection 15 projecting from an inner circumferential surface of the second housing member 13. The peripheral flange 16*a* of the fuel adsorbent member 16 is held in contact with a lower side of the projection 15. The fuel adsorbent member 16 is then secured to the projection 15 through laser radiation on the peripheral flange 16*a*. Further, a high strength portion 27, or the holder, is provided in a portion of the fuel adsorbent member 16 in which the extent of influence by the backfire pressure P1 becomes greater than the other parts. The high strength portion 27 is arranged closer to the inlet port 12*a* of the peripheral flange 16*a*. The high strength portion 27 is formed by adding a reinforcement laser welded portion 29 to a laser welded portion 28. The fifth embodiment has advantages equivalent to the advantages of the fourth embodiment.

A sixth embodiment of the present invention will hereafter be described with reference to FIGS. 10 and 11. The description will omit detailed explanation of components of the sixth embodiment that are same as or like the corresponding components of the first embodiment.

Figure 10:
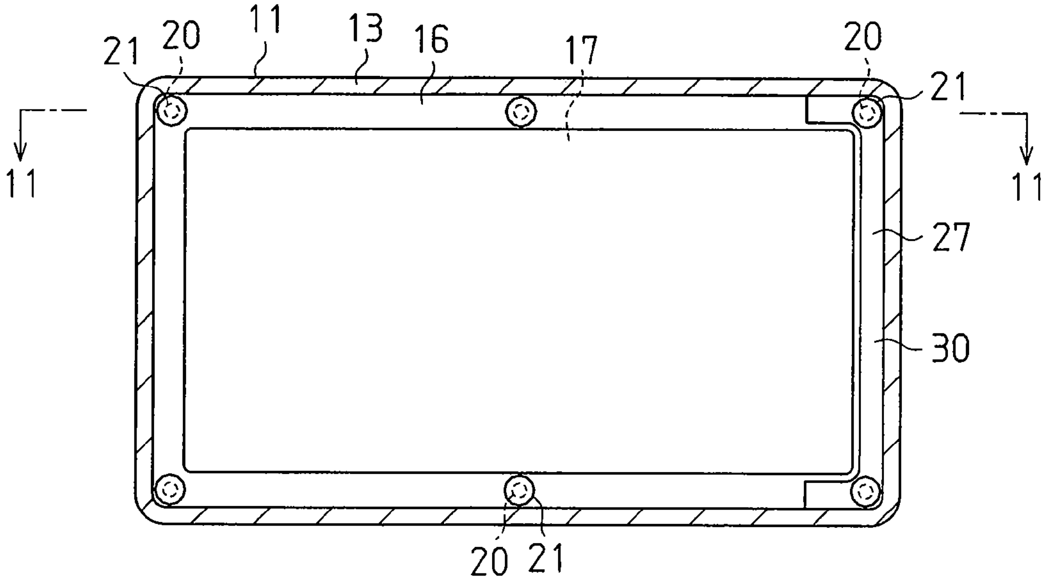
FIG. 10 is a cross-sectional view showing an air cleaner according to a sixth embodiment of the present invention.
Figure 11:
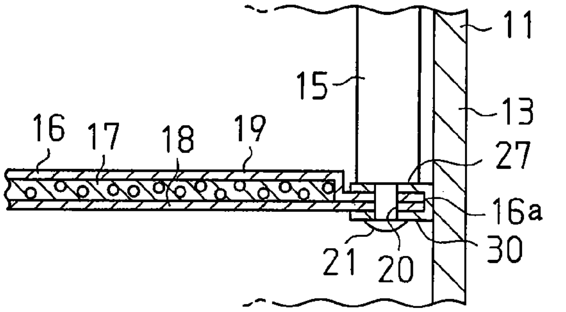
FIG. 11 is a cross-sectional view showing a portion of the air cleaner of FIG. 10, taken along line 11-11 of the drawing.

As shown in FIGS. 10 and 11, the peripheral flange 16*a* of the fuel adsorbent member 16 includes a frame member 30 formed of synthetic resin. The frame member 30 covers a portion of the peripheral flange 16*a* in which the extent of influence by the backfire pressure P1 becomes greater than the other parts, or a portion closer to the inlet port 12*a*. The frame member 30 defines a high rigidity portion, or the holder. The frame member 30 thus functions equivalently to the high strength portion 27, which defines the holder of the fourth embodiment. The frame member 30 is secured to the projections 15 together with the peripheral flange 16*a* of the fuel adsorbent member 16 through thermal swaging of the pins 21. More specifically, the frame member 30 covers only the portion of the peripheral flange 16*a* in which the extent of influence by the backfire pressure P1 becomes greater, not the entire peripheral portion of the fuel adsorbent member 16. This facilitates installation of the frame member 30, thus reducing the weight of the air cleaner.

Accordingly, since the frame member 30 allows the fuel adsorbent member 16 to bear the backfire pressure P1, the sixth embodiment has advantages equivalent to the advantages of the fourth embodiment.

The illustrated embodiments may be modified in the following forms.

Figure 12:
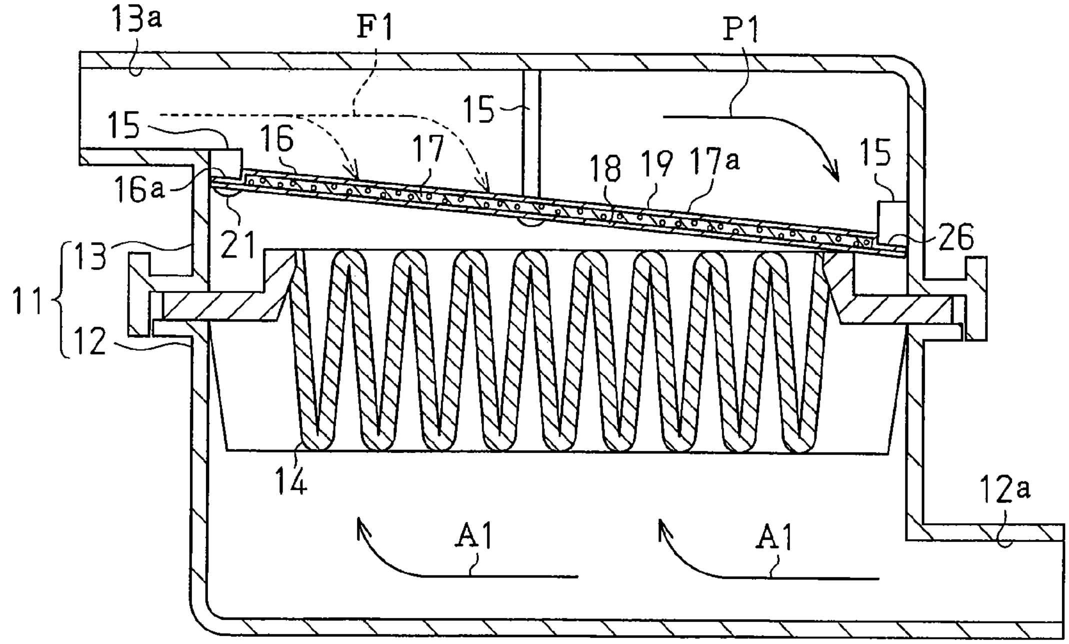
FIG. 12 is a longitudinal cross-sectional view showing a modification of the air cleaner.

As shown in FIG. 12, in the housing 11, the fuel adsorbent member 16 may be inclined such that an end of the fuel adsorbent member 16 in which the extent of influence by the backfire pressure P1 becomes greater is shifted downward. This enlarges the space corresponding to the portion of the fuel adsorbent member 16 in which the extent of influence by the backfire pressure P1 becomes greater, compared to the space corresponding to the other part. The enlarged space functions as a buffer when an engine backfire occurs. The securing portion of the fuel adsorbent member 16 is thus prevented from being damaged.

Figure 13:
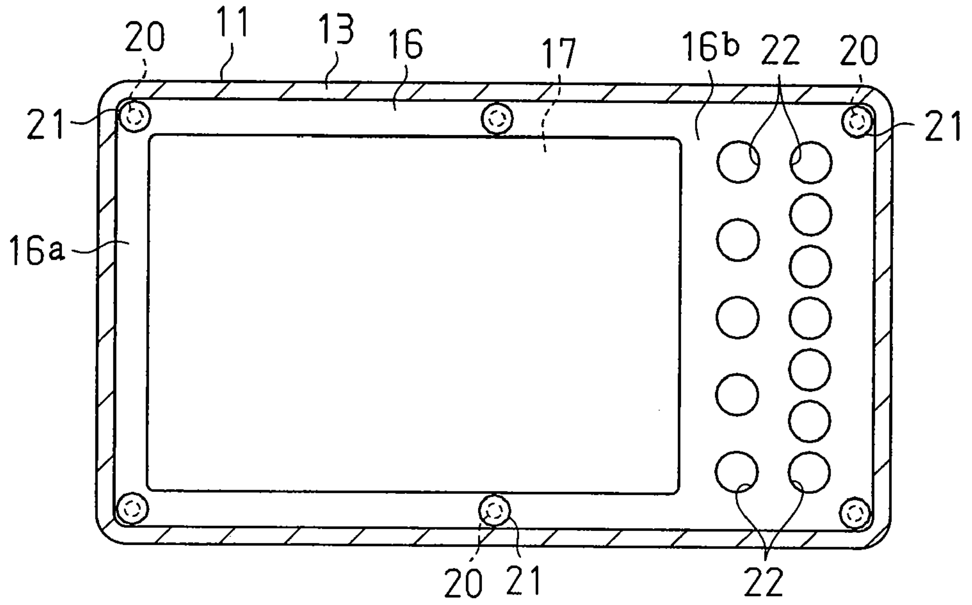
FIG. 13 is a cross-sectional view showing the modification of the air cleaner.

Referring to FIG. 13, the density of the release holes 22 or the diameter of each release hole 22 may be increased toward an end of the fuel adsorbent member 16 at which the extent of influence by the backfire pressure P1 becomes greater. This structure smoothly releases the backfire pressure P1 in the case of an engine backfire.

The shape of each release hole 22 may have any suitable shapes other than the circular shape, such as a rectangular shape and a slit-like shape.

Figure 14:
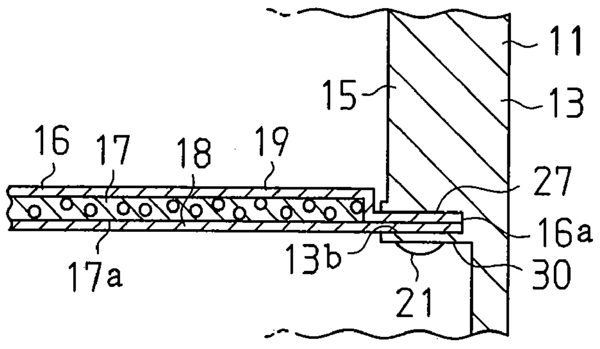
FIG. 14 is a cross-sectional view showing a portion of a modification of a securing structure of the fuel adsorbent member.

As illustrated in FIG. 14, a holding groove 13*b* may be defined in the second housing member 13. An end of the fuel adsorbent member 16 is received in and supported by the holding groove 13*b*, while being secured to the projections 15 using the pins 21. This arrangement reinforces the portion of the fuel adsorbent member 16 in which the extent of influence by the backfire pressure P1 becomes greater.

In the fourth embodiment of FIG. 7 and the fifth embodiment of FIGS. 8 and 9, the quantity of the thermally swaged pins 21 or the quantity of the reinforcement laser welded portions 29, which define the high strength portion 27, may be altered as needed.

The present examples and embodiments are to be considered as illustrative and not restrictive and the invention is not to be limited to the details given herein, but may be modified within the scope and equivalence of the appended claims.

The invention claimed is:

1. An air cleaner having a filter element that filters air, comprising:

a housing that accommodates the filter element;

a fuel adsorbent member that is secured to the housing and adsorbs evaporative fuel, the fuel adsorbent member being provided downstream from the filter element, the fuel adsorbent member having a sheet-like shape as a whole; and a holder that holds the fuel adsorbent member in a state secured to the housing when the fuel adsorbent member receives a backfire pressure from an intake system of an engine, the holder being arranged in a portion of the fuel adsorbent member in which an extent of influence by the backfire pressure is great, wherein the holder reduces the backfire pressure in the portion of the fuel adsorbent member in which the extent of influence by the backfire pressure is great, wherein the holder is defined by a release portion that releases the backfire pressure to an upstream side of the fuel adsorbent member, wherein the release portion is arranged in a portion of the fuel adsorbent member, wherein the release portion is defined by a plurality of holes passing through the fuel adsorbent member, the holes being spaced from one another and having a through-hole structure that connects between upstream and downstream sides of the fuel adsorbent member.

2. The air cleaner according to claim 1, wherein:

the housing has an inlet port and an outlet port connected to the engine; and at least one of the plurality of holes are arranged at a position spaced from the outlet port.

3. The air cleaner according to claim 1, wherein the fuel adsorbent member includes a holding sheet holding an adsorbent, a pair of cover sheets that cover opposite sides of the holding sheet and a peripheral flange arranged along the outer end of the holding sheet, wherein the peripheral flange is formed by extending the cover sheets to a position in which the adsorbent is not included and bonding the extended cover sheets with each other, wherein the fuel adsorbent member includes a double-layered portion that is formed continuously from the peripheral flange, and wherein the double-layered portion is provided with at least one of holes for releasing the back fire pressure to the upstream side of the fuel adsorbent member.

4. The air cleaner according to claim 3, wherein the peripheral flange is provided with a plurality of attachment holes receiving a pin used for attaching the fuel adsorbent member to the air cleaner, and wherein the attachment hole is covered by the pin when the fuel adsorbent member is attached to the air cleaner.

5. The air cleaner according to claim 2, wherein the fuel adsorbent member includes a holding sheet holding an adsorbent, a pair of cover sheets that cover opposite sides of the holding sheet and a peripheral flange arranged along the outer end of the holding sheet, wherein the peripheral flange is formed by extending the cover sheets to a position in which the adsorbent is not included and bonding the extended cover sheets with each other, wherein the fuel adsorbent member includes a double-layered portion that is formed continuously from the peripheral flange, and wherein the double-layered portion is provided with at least one of the holes for releasing the back fire pressure to the upstream side of the fuel adsorbent member.

6. The air cleaner according to claim 5, wherein the peripheral flange is provided with a plurality of attachment holes receiving a pin used for attaching the fuel adsorbent member to the air cleaner, and wherein one of the attachment holes is covered by the pin when the fuel adsorbent member is attached to the air cleaner.

7. A fuel adsorbent member used in an air cleaner for adsorbing evaporative fuel, the air cleaner has an inlet port and outlet port connected to an engine, the fuel adsorbent member having a sheet-like shape as a whole, the fuel adsorbent member comprising:

a low air flow resistance portion formed in an outer end of the fuel adsorbent member for partially decreasing air flow resistance of the outer end of the fuel adsorbent member, wherein, when the fuel adsorbent member is installed in the air cleaner, a backfire pressure of the engine is released through the low air flow resistance portion, and wherein the low air flow resistance portion is defined by a plurality of holes passing through the fuel adsorbent member, the holes being spaced from one another and having a through-hole structure that connects between upstream and downstream sides of the fuel adsorbent member.

8. The fuel adsorbent member according to claim 7, wherein:

at least one of the plurality of holes are arranged at a position spaced from the outlet port of the air cleaner.

9. The fuel adsorbent member according to claim 7, wherein the fuel adsorbent member includes a holding sheet holding an adsorbent, a pair of cover sheets that cover opposite sides of the holding sheet and a peripheral flange arranged along the outer end of the holding sheet, wherein the peripheral flange is formed by extending the cover sheets to a position in which the adsorbent is not included and bonding the extended cover sheets with each other, wherein the fuel adsorbent member includes a double-layered portion that is formed continuously from the peripheral flange, and wherein the double-layered portion is provided with at least one of holes for releasing the back fire pressure to the upstream side of the fuel adsorbent member.

10. The fuel adsorbent member according to claim 9, wherein the peripheral flange is provided with a plurality of attachment holes receiving a pin used for attaching the fuel adsorbent member to the air cleaner, and wherein the attachment hole is covered by the pin when the fuel adsorbent member is attached to the air cleaner.

11. The fuel adsorbent member according to claim 8, wherein the fuel adsorbent member includes a holding sheet holding an adsorbent, a pair of cover sheets that cover opposite sides of the holding sheet and a peripheral flange arranged along the outer end of the holding sheet, wherein the peripheral flange is formed by extending the cover sheets to a position in which the adsorbent is not included and bonding the extended cover sheets with each other, wherein the fuel adsorbent member includes a double-layered portion that is formed continuously from the peripheral flange, and wherein the double-layered portion is provided with at least one of holes for releasing the back fire pressure to the upstream side of the fuel adsorbent member.

12. The fuel adsorbent member according to claim 11, wherein the peripheral flange is provided with a plurality of attachment holes receiving a pin used for attaching the fuel adsorbent member to the air cleaner, and wherein the attachment hole is covered by the pin when the fuel adsorbent member is attached to the air cleaner.

* * * * *

UNITED STATES PATENT AND TRADEMARK OFFICE

CERTIFICATE OF CORRECTION

PATENT NO. : 7,608,137 B2 
APPLICATION NO. : 11/423248
DATED : October 27, 2009
INVENTOR(S) : Kouichi Oda It is certified that error appears in the above-identified patent and that said Letters Patent is hereby corrected as shown below:

On the Title Page of the patent, under the Item (30) "Foreign Application Priority Data", the Japanese priority application number reading (2005-075466) should read --2005-175466--.

Signed and Sealed this

Twenty-sixth Day of January, 2010

David J. Kappos
*Director of the United States Patent and Trademark Office*